Figure 1:
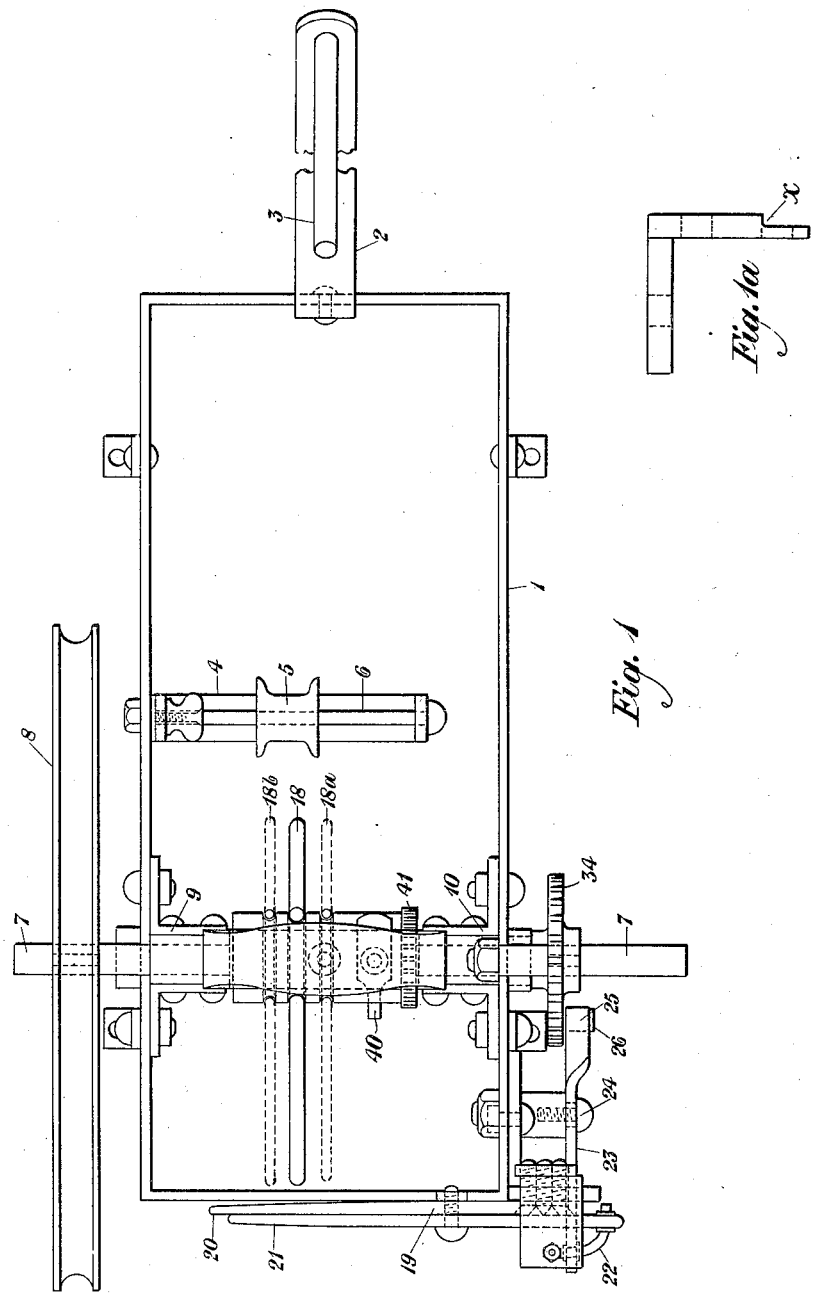

April 8, 1930.    T. C. REED ET AL    1,753,869
METHOD AND MEANS FOR PREPARING INSULATING SLEEVES
Filed June 30, 1925    4 Sheets-Sheet 2

INVENTORS
T.C.Reed and A.D.Odell
BY
ATTORNEY

April 8, 1930.  T. C. REED ET AL  1,753,869
METHOD AND MEANS FOR PREPARING INSULATING SLEEVES
Filed June 30, 1925  4 Sheets-Sheet 4

INVENTORS
T.C. Reed and A.D. Odell
BY
ATTORNEY

Patented Apr. 8, 1930

1,753,869

UNITED STATES PATENT OFFICE

THOMAS C. REED, OF COVINGTON, KENTUCKY, AND AUBREY D. ODELL, OF CINCINNATI, OHIO, ASSIGNORS TO AMERICAN TELEPHONE AND TELEGRAPH COMPANY, A CORPORATION OF NEW YORK

METHOD AND MEANS FOR PREPARING INSULATING SLEEVES

Application filed June 30, 1925. Serial No. 40,615.

This invention relates to a method and means for producing sleeves used for insulating electrical conductors, the said method and means being characterized by the impregnation of a sleeving or tubing formed of cotton or other suitable material to render it moisture proof, expanding the sleeving into cylindrical form and cutting it into sections of desired length.

In the splicing of electrical conductors, particularly those used in telephone cables, which are of relatively fine wire insulated with paper, it is customary to insulate the bare section of twisted wire by means of a sleeve or tube of cotton. The sleeve employed for this purpose is usually about three inches long and the method heretofore employed for preparing such tube is as follows: In order to drive off the moisture that the cotton in its natural state has absorbed, and also to prevent the absorption of moisture after the sleeve has been employed in the splicing of a cable, the cotton sleeving is impregnated by dipping it into melted paraffin at a fairly high temperature, the sleeving being kept in the paraffin until all moisture has been driven from the sleeving and thorough impregnation has taken place. The length of the sleeving impregnated at any one time depends upon various factors such as the number of conductors to be spliced and the rate of splicing. After the sleeving has cooled it is cut into sections of desired length by the splicer's helper. These sections, which are in a flattened condition not unlike, in appearance, a piece of cotton tape, must be punched in order to render them substantially cylindrical, thereby making them readily usable by the splicer. For this purpose the helper employs a cotton sleeve punch which, when inserted into the tubing, expands it, thus forming a cylindrical tube of such diameter as will permit it to slip readily over the twisted joint to be insulated thereby.

Usually this preliminary work on the sleeving is done by the splicer's helper during the time when he must remain on the street in order to guard the open manhole in which the splicer is working. Where local conditions are such that the helper can assist the splicer in a manhole, a considerable saving in labor cost may be effected if the sleeving is impregnated, cut, and punched at some central point and is thus furnished to the splicer on each job. By so doing, the helper's services may be employed more directly in the making of the splice.

This invention resides in a method and means for the automatic production of cotton sleeves of the desired length, impregnated with paraffin or other suitable material to render them moisture proof, and cylindrically expanded to the desired diameter.

Figure 2:
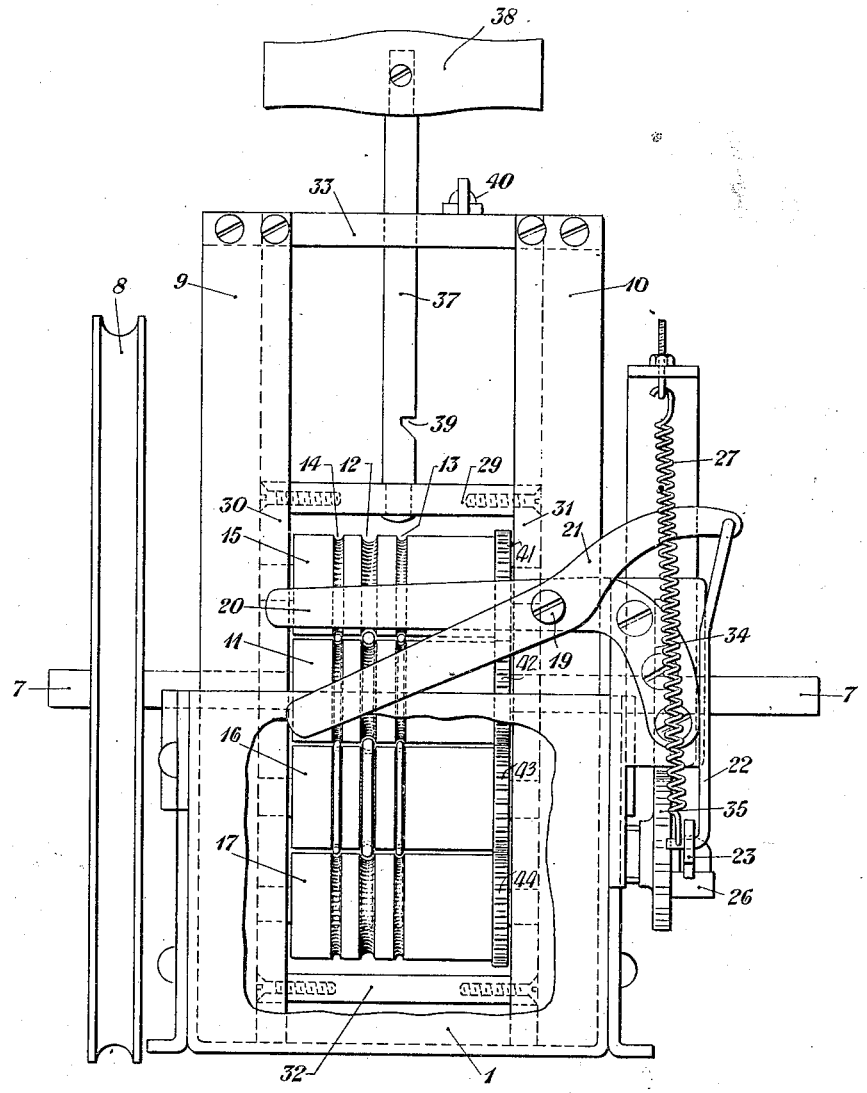
Figure 3:
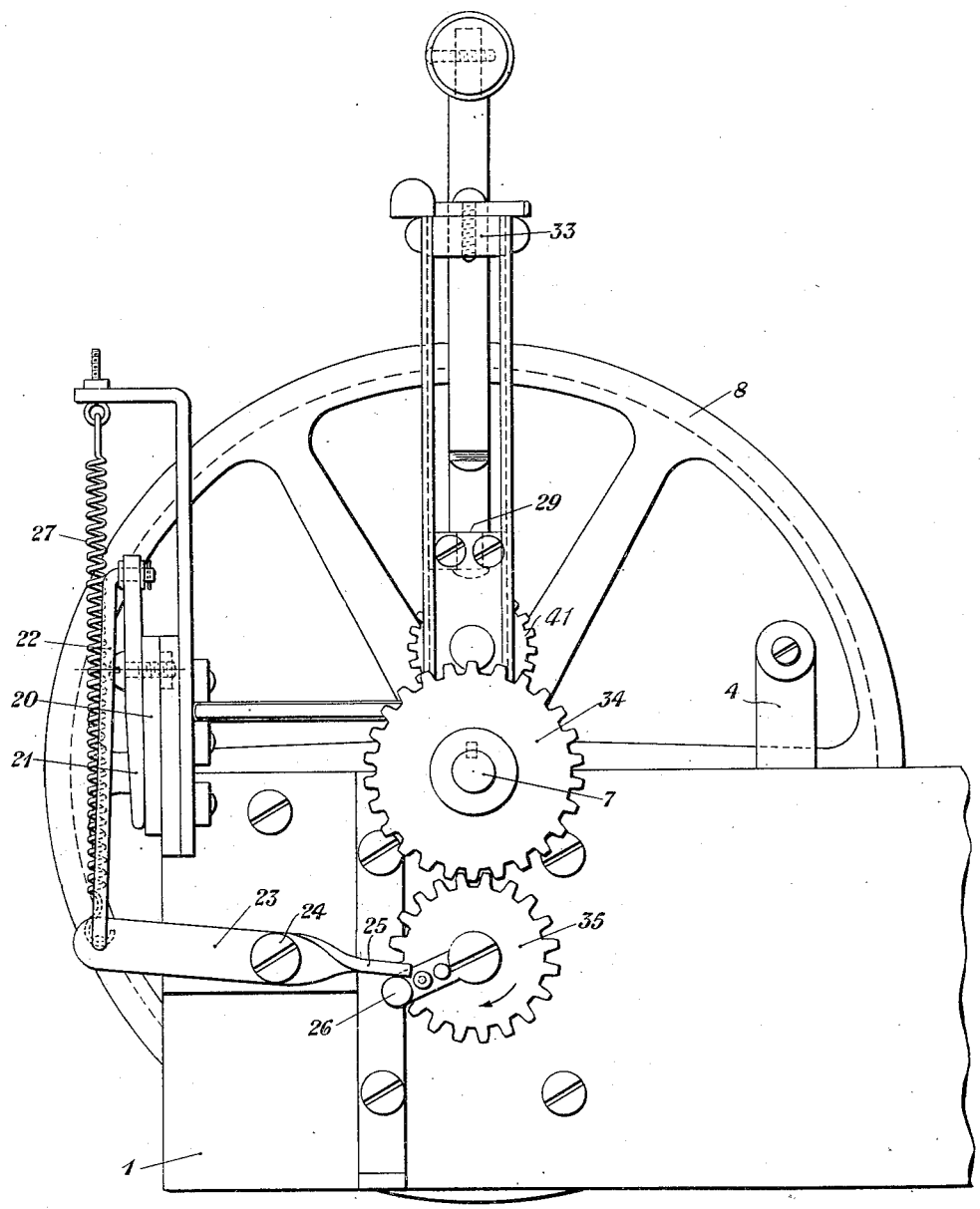
Figure 4:
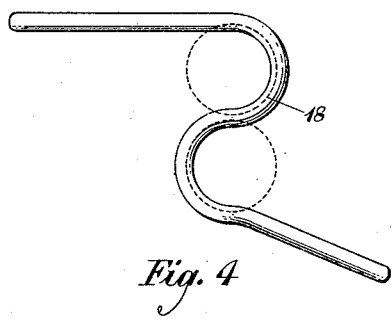
Figure 5:
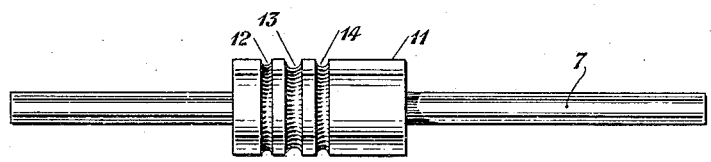
Figure 6:
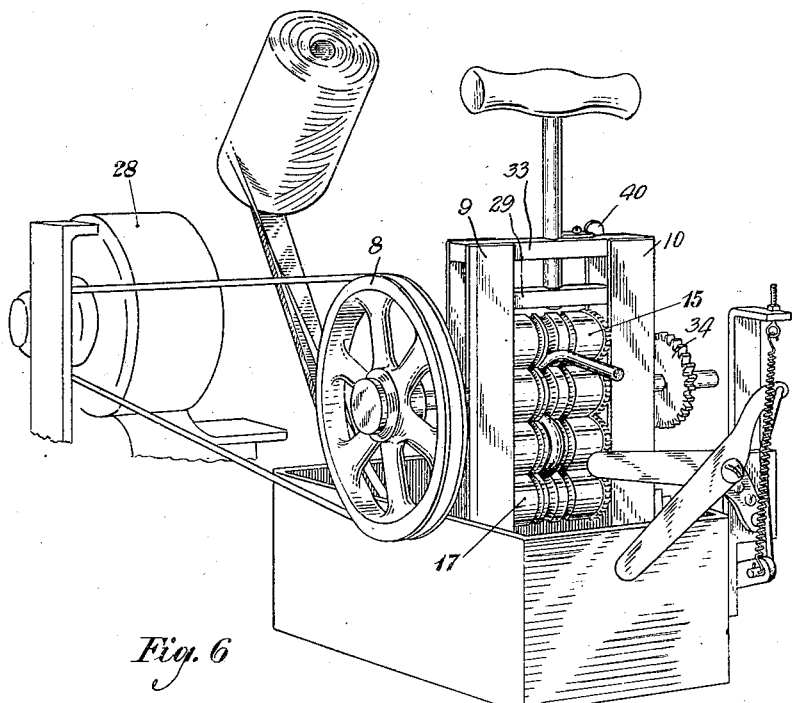

Other objects of this invention will be apparent from the following description when read in connection with the attached drawing, of which Figure 1 is a plan view of the machine in which this invention is embodied; Fig. 1ª is a detail of Figure 1; Fig. 2 is an end view of the said machine, in which the tank is shown as broken away in order to show details within the tank; Fig. 3 is a side view of part of the machine; Fig. 4 is an S-shaped mandrel by means of which the cotton tubing is expanded; Fig. 5 is a view of one of the rollers, showing the knurled grooves therein for supporting the mandrel and for forcing the tubing over the said mandrel, and Fig. 6 is an isometric view of a machine embodying the details shown in the other figures.

Fig. 1 shows a tank 1 for holding paraffin or other suitable material for the impregnation of the cotton tubing. The impregnating material may be heated and kept in that condition by any suitable source of heat, such as a gas burner shown by 36 of Fig. 6. Thus, attached to one end of the tank is a member 2 carrying a spindle 3 which is intended to pass through the hole of a spool upon which cotton sleeving is usually wound in order to hold the spool while the sleeving is being impregnated and punched. If the sleeving is available in some form other than upon spools, as, for example, in cans such as are used in the mills where the sleeving is manufactured, it will, of course, be obvious that the sleeving may be fed to the machine directly from such cans, and the spool supporting device will, of course, be unnecessary. Adjustably attached to one side of the tank is a stirrup-shaped member 4 which carries a flanged roller 5 supported upon a shaft 6. The member 4 is pivoted upon the side of the tank so that the said roller may be adjusted and firmly held in any desired position. The sleeving extends from the spool upon the spindle 3 to the under side of the said roller, and thence to the expanding mechanism which will now be described.

The mechanism for expanding the sleeving is supported by a framework which in turn is slidably supported within the tank 1. The means for slidably supporting said framework comprises a plurality of angle-irons designated 9 and 10, attached to the inner faces of the sides of the tank. The form of the angle-iron is shown in Fig. 1ᵃ. One of the flanges thereof, namely, that one which is perpendicular to the side of the tank when the iron is attached thereto, has a groove therein, designated x. The grooves in the corresponding angle-irons at each side of the tank serve to guide the framework which fits therein.

As will be seen clearly from Fig. 2, the framework comprises top and bottom members 29 and 32, respectively, and side members designated 30 and 31, which do not appear in the drawing, being behind the angle-irons 9 and 10. These side members 30 and 31 provide the bearings for a plurality of rollers, designated 11, 15, 16 and 17. The shafts of the rollers 15, 16 and 17 are just sufficiently long to extend through and be supported by the side members 30 and 31 of the framework. The shaft of the roller 11 is longer than the others, extending beyond the sides of the tank in the manner shown clearly in the figures. Fixedly attached to one end of the shaft of the roller 11 is a pulley 8, by means of which some form of motor is connected with the machine for the purpose of driving it. Similarly attached to the opposite end of the shaft of the roller 11 is a gear 34, which is adapted to mesh with the gear 35 for the purpose of operating the cutting device of the machine. Each of the rollers 11, 15, 16 and 17 has fixedly connected therewith a gear as indicated by 42, 41, 43 and 44, respectively, which, as shown clearly in Fig. 2, is interposed between the rollers and the side member 31 of the framework. The gears of the adjacent rollers mesh each with the other, so that the rotation of the shaft 7 connected with the roller 11 effects the rotation of the other rollers.

Each of the rollers has therein a plurality of grooves 12, 13 and 14. The rollers are so arranged that the corresponding grooves of all the rollers lie in the same vertical plane. As will be seen from Fig. 5, the center groove is the widest, and the one at the right-hand side is wider than that at the extreme left. The radius of the groove depends upon the diameter of the mandrel employed in connection with that groove, and the diameter of the mandrel depends upon the size of the tubing to be punched. The machine shown has been designed to produce sleeves of different diameters and for that reason grooves of different sizes are provided for the accommodation of mandrels of different sizes. The form of the mandrel employed is shown in Fig. 4. As will be clearly seen from Figs. 2 and 6, the mandrel is so proportioned and adjusted with respect to the rollers that rollers 11 and 16 fit within the upper and the lower halves of the mandrel, as indicated by the dotted circles of Fig. 4. As will be seen from Fig. 6, the grooves of rollers 15 and 17 tend to press upon the mandrel from above and below respectively and thereby keep it in position.

Only one mandrel would be in position in the rollers at any one time, the size of the mandrel depending upon the size of the sleeving to be expanded. This is shown clearly by the mandrel 18 in solid lines in Fig. 1 and by the correspondingly positioned mandrel of Fig. 6. Neither of the mandrels 18ᵃ and 18ᵇ, shown in dotted lines in Fig. 1, would be in position when the mandrel 18 was being employed. When it is necessary to change mandrels, or to start a new spool of sleeving upon a mandrel, the expanding mechanism, viz, the rollers and mandrel, are lifted out of the tank 1 by pulling upon the handle 38 connected with the rod 37 which is connected with the upper member 29 of the framework supporting the rollers. The framework is raised until the notch 39 is above the member 33, at which point it will be engaged by the locking device 40.

From Figs. 2 and 5 it will be seen that the surface of each groove is knurled or otherwise roughened, the purpose of the roughened surface being to grip the cotton sleeving and to push or otherwise force it along the S-shaped mandrel. That is to say, the cotton sleeving passing under the flanged roller 5 extends to the lower end of the mandrel 18 (or 18ᵃ or 18ᵇ, depending on the size of the sleeving), which end is near the roller 5. When the sleeving has been pushed along the mandrel sufficiently far to bring it into engagement with the knurled surfaces of the lower pair of rollers 16 and 17, it will be caught by such surfaces and dragged along and over the mandrel, passing in due course from rollers 17 and 16 to 11 and 15, and will be expanded and formed thereby. Ultimately the sleeving will be forced from the upper end of the mandrel, i. e., the end projecting towards the front of the machine.

The sleeving, which by this time is fully expanded and is cylindrical in form, passes between the blades of the shears 19 which, as shown in Fig. 2, comprise a fixed blade 20 and a movable blade 21. As will be seen clearly from Fig. 3, one end of the movable blade is connected by a link 22 with one end of the member 23 pivoted at 24 to the side of the tank 1. The inner end of the member 23, which may be designated 25, is adapted to make contact periodically with a pin 26 fixedly connected with the gear 35. The action of this pin is to raise the inner end of the member 23, thereby pulling down on the link member 22 and effectively bringing together the blades of the shears 19. From Fig. 3 it will be seen that the gear 34 meshes with the gear 35, which is rotatably supported by the side wall of the tank 1. A spring 27 is connected with the member 23 so as to pull the outer end of that member upward after the pin 26 has passed out of engagement with the inner end of the said member. The effect of the spring is to open the blades of the shears 19 each time after they have operated. As stated heretofore, the shears in Fig. 6 are shown in position below the upper end of the S-shaped mandrel, but it is to be understood that in actual operation the shears would be in such position with respect to the upper end of the mandrel that the expanded tubing would project between the blades of the shears so as to be cut off by their operation. The machine may be driven, as shown in Fig. 6, by means of a motor 28 or by any other suitable means.

From the foregoing description of the functions performed by the various parts of this machine and the mode of cooperation of the parts, the manner in which this machine operates for the production of finished cotton sleeves will be apparent without much additional detailed description. A spool of cotton sleeving is mounted upon the spindle 3, as shown clearly in Fig. 6, and the outer end of the sleeving is placed beneath the flanged roller 5 which should be always kept below the surface of the melted paraffin in the tank 1. This end of the sleeving is then placed over the lower end of the mandrel of the desired diameter, as for example, 18, and is pushed over the mandrel until the sleeving engages or is engaged by the knurled surfaces of the slots of the lower rollers 16 and 17. The rotation of these rollers will draw the sleeving along the mandrel, the sleeving passing successively through the grooves of rollers 16 and 11 and through the grooves of 11 and 15. The sleeving will then be forced beyond the upper end of the mandrel and will extend between the blades of the shears 19.

The rotation of the shaft 7 will periodically bring the pin 26 in contact with the inner end of the member 23, and assuming rotation in the direction of the arrow, the outer end of the member will be forced downward, which will pull down that end of the movable blade of the shears 19 to which the linking member 22 is connected. As the gear 35 continues to rotate and the pin 26 presses against the inner end of the member 23, the blades of the shears 19 will be brought together, and the cotton sleeving extending from the ends of the mandrels between the blades of the shears, will be cut. By proper adjustment of the frequency of operation of the shears 19 with respect to the speed of the cotton sleeving as it passes over the mandrel, the sleeving may be cut into sections of any desired length. After the pin 26 passes out of engagement with the inner end of the member 23, the spring 27, which has been stretched, contracts and opens the blades of the shears 19 so as to be ready for the next section of cotton sleeving issuing from the mandrel.

From the foregoing description it will be seen that by employing the S-shaped mandrel and by utilizing a plurality of grooved rollers in which the curved surfaces of the grooves are knurled, not only is the mandrel held fixedly though not rigidly within the machine but also the material to be worked upon by the mandrel is readily forced over the said mandrel. The novel combination thus performs mechanically the operations heretofore carried out manually, with a resultant economy due to the greater efficiency of operation.

While this invention has been disclosed as embodied in a particular form, it is to be understood that it is capable of embodiment in other and different forms without departing from the spirit and scope of the appended claims.

What is claimed is:

1. In a machine for producing insulating sleeves from a relatively long section of impregnated, collapsed sleeving, the combination with an S-shaped mandrel having substantially uniform cross-section throughout its length for expanding the sleeving, of a plurality of rollers having grooves therein for the support of the said mandrel, the said mandrel lying partly within the grooves and partly encircling certain of the said rollers and being held in position by other grooved rollers, the said grooves being of such size relative to the cross-sectional dimensions of the said mandrel and being so roughened as to grip the said sleeving and force it over the said mandrel whenever the said rollers are rotated.

2. In a machine for producing insulating sleeves from a relatively long section of impregnated collapsed sleeving, the combination with an S-shaped mandrel for expanding the sleeving, of a plurality of rollers having grooves therein, the said mandrel lying partly within the said grooves and partly encircling certain of said rollers, and being held in position by the co-action of other grooved rollers with the said certain rollers.

3. In a machine for producing insulating sleeves from a relatively long section of impregnated, collapsed sleeving, the combination with an S-shaped mandrel formed from a rod having substantially uniform cross-section throughout its length, of a plurality of rollers, each having a groove therein, and all of said grooves lying in the same plane, two of said rollers being so positioned that the upper portion of the S-shaped mandrel will lie partly in the groove of and will partly encircle one of the said two rollers, and the other portion of the said mandrel will lie partly in the groove and will partly encircle the other of the said two rollers, the said mandrel being held in position by other grooved rollers. one co-acting with the first mentioned roller that is partly encircled by the said mandrel and the other co-acting with the last mentioned roller that is partly encircled by the said mandrel.

In testimony whereof, we have signed our names to this specification this 27th day of June, 1925.

THOMAS C. REED.
AUBREY D. ODELL.